INVENTOR:
EDWARD H. DINGER,
BY James J. Williams
HIS ATTORNEY.

June 1, 1965 E. H. DINGER 3,187,203

WAVE GENERATING CIRCUIT

Filed Sept. 26, 1960

2 Sheets-Sheet 2

INVENTOR:
EDWARD H. DINGER,

BY James J. Williams
HIS ATTORNEY.

United States Patent Office 3,187,203

Patented June 1, 1965

3,187,203

WAVE GENERATING CIRCUIT

Edward H. Dinger, Waynesboro, Va., assignor to General Electric Company, a corporation of New York Filed Sept. 26, 1960, Ser. No. 58,570
2 Claims. (Cl. 307—106)

The invention relates to a wave generating circuit, and particularly to a wave generating circuit capable of producing timing or firing waves having a sawtooth or cosine shape.

Presently available transistors are restricted in certain of their applications by the fact that their power handling ability is limited by their small heat dissipation ratings. Generally, a transistor may, by direct modulation, control an amount of power no greater than four times the heat dissipation rating of the control electrode of the transistor. However, a transistor can switch much larger amounts of power on and off. This ability results from the fact that when the transistor is cut off, there is very little leakage current present, and hence very little heat dissipation within the transistor. This ability also results from the fact that when the transistor is turned on, there is very little voltage drop across the electrodes of the transistor to cause heat dissipation within the transistor. Thus, the internal heat dissipation within the transistor is very low in either the cutoff condition or in the turned-on condition. It follows that in order for the transistor to switch appreciable amounts of power on and off, it may be desirable or necessary that the transistor be turned on or cut off as rapidly as possible to minimize the internal heat dissipation within the transistor during the transition between the turned-on condition and the cutoff condition. The same remarks are also applicable to a certain degree to controlled rectifiers.

Accordingly, an object of the invention is to provide a wave generating circuit capable of producing firing waves which change amplitude in a relatively short period of time.

Another object of the invention is to provide a wave generating circuit capable of producing firing waves in response to an ordinary alternating current source.

In addition to the desirable feature of switching transistors on and off rapidly, it is also desirable that the transistors be switched on and off at a predetermined and controllable time. A sawtooth wave or a cosine wave may be desirable inasmuch as such waves change their amplitude with respect to time in a predetermined manner, and hence lend themselves readily to timing circuits.

Thus, another object of the invention is to provide a wave generating circuit capable of producing timing waves having a predetermined shape or having an amplitude which varies with respect to time in a predetermined manner.

Another object of the invention is to provide a novel wave generating circuit capable of producing waves of predetermined shape in response to an ordinary alternating current source.

Briefly, these and other objects are accomplished in accordance with the invention by a circuit which is adapted to be operated with a conventional source of alternating current, such as 60 cycle alternating current. The circuit comprises a first capacitor coupled in series with a first rectifier across the source for charging the first capacitor in response to potentials of the source above a predetermined level. A second capacitor and a second rectifier are coupled in series across the source and means are coupled between the first and second capacitors for charging the second capacitor from the charge on the first capacitor. The second capacitor is discharged in response to potentials of the source below the predetermined level. In operation, the second capacitor has a voltage which rises and falls in sawtooth fashion in accordance with the rise and fall of the alternating current potential. Means are coupled to the second capacitor for deriving an output signal therefrom. In another embodiment, intended to provide a wave of cosine shape, only one capacitor and rectifier are utilized, the capacitor being charged by the sinusoidal source of potential to assume a voltage of cosine shape, and is discharged by the source through the rectifier. Switching applications which utilize the wave generating circuits of this invention are shown in Patent No. 3,071,697, filed concurrently herewith on September 26, 1960, Serial No. 58,474.

The invention will be better understood from the following description taken in connection with the accompanying drawing and its scope will be pointed out in the claims. In the drawings:

Figure 1:
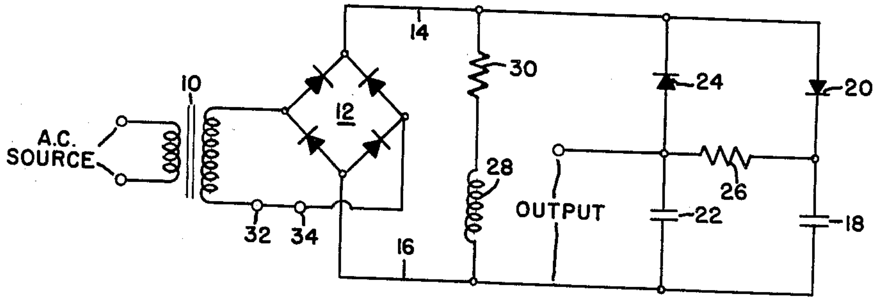
FIGURE 1 shows one embodiment of the invention that produces a sawtooth wave in response to each half cycle of an alternating current source.

In the various figures, the same reference numerals are used to refer to the same or comparable elements. With reference to FIGURE 1, the wave generating circuit is provided with a conventional alternating current source having a frequency, for example, of 60 cycles. Other frequencies may also be used. This source is applied to the primary winding of a transformer 10 having a secondary winding of more or less turns than the primary winding depending upon the desired voltage. If consideration of the terminals 32, 34 is omitted until later, the secondary winding is coupled to a rectifier bridge network 12 having four rectifiers connected as shown. As is known in the art, this network 12 provides a full wave rectified signal at its output terminals 14, 16. As is also known, full wave rectification may also be provided by using only two rectifiers connected to the ends of the secondary winding of the transformer 10, the secondary winding being provided with a center tap for a return path. A first capacitor 18 and a first rectifier 20 are coupled in series between the output terminals 14, 16. The first rectifier is poled to permit normal current to flow from the first terminal 14 to the second terminal 16 in response to the rectified signal. Thus during the time that the voltage on the first terminal 14 rises above a predetermined level (with respect to the voltage on the second terminal), the first rectifier 20 permits current to flow and charges the first capacitor 18 so that its upper terminal is positive with respect to its lower terminal. A second capacitor 22 is also coupled in series with a second rectifier 24 between the output terminals 14, 16. The second rectifier 24 is poled so that it tends to permit current to flow in a direction from the second terminal 16 to the first terminal 14. The junction of the first capacitor 18 and first rectifier 20 is coupled to the junction of the second capacitor 22 and the second rectifier 24 by a charging resistor 26. Output signals are derived by suitable connections across the second capacitor 22 as indicated. A discharge circuit, including a serially connected inductance 28 and a resistor 30, is coupled in series between the terminals 14, 16.

Figure 2:
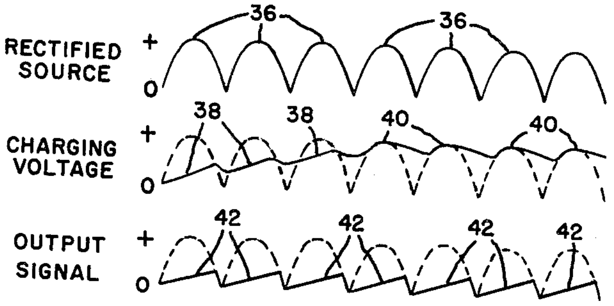
FIGURE 2 shows waveforms for explaining the operation of the embodiment of FIGURE 1.

The operation of the embodiment shown in FIGURE 1 will be explained in connection with the waveforms shown in FIGURE 2. In FIGURE 2, the voltage of the terminal 14 with respect to the terminal 16 is shown by the rectified waves 36 which, for a sinusoidal source, are half sine waves. The waves 36 are continuous because of the full wave rectification provided by the rectifier bridge network 12. The rectified waves 36 begin charging the first capacitor 18 as indicated by the waves 38 in FIGURE 2. After the rectified waves 36 have been applied to the terminals 14, 16 for a few cycles, the first capacitor 18 becomes as highly charged as possible for a given set of conditions as indicated by the waves 40 in FIGURE 2. In this connection, the first capacitor 18 may discharge slightly during the decreasing portion of the rectified waves 36, but is charged back up again during the increasing portion of the rectified waves 36. In other words, during the time that the voltage on the first terminal 14 exceeds the voltage on the second terminal 16 by a predetermined amount (i.e., when the voltage on the first terminal 14 exceeds a predetermined level), the first capacitor 18 receives a charge of current. However, when the voltage on the first terminal 14 is at its lowest level with respect to the voltage on the second termial 16 (i.e., when the voltage on the first terminal 14 falls below a predetermined level), the first capacitor 18 supplies current through a path including the charging resistor 26 and the second capacitor 22, thereby providing a charge on the second capacitor 22. The voltage on the second capacitor 22 is the output signal represented by the wave 42 in FIGURE 2. This charge is indicated by the rising portion of the the wave 42. The second capacitor 22 continues to receive this charge until the voltage on the first terminal 14 falls below a predetermined level, this level being determined by the amount of charge on the second capacitor 22 and the forward breakdown voltage of the second rectifier 24. When this condition occurs, the second capacitor 22 rapidly discharges through a path including the second rectifier 24, the discharge resistor 30, and the discharge inductance 28. This discharge is indicated by the falling portion of the wave 42. Thus, a sawtooth wave is provided in accordance with the voltage on the second capacitor 22 and in synchronization with the applied source. The second capacitor 22 discharges rapidly because of the inductive effect of the discharge inductance 28. During the rising portion of the rectified waves 36, the discharge inductance 28 receives an amount of current determined in part by the magnitude of the discharge resistor 30 and by the average magnitude of the voltage across the terminals 14, 16. During the time that the instantaneous voltage of the rectified waves 36 falls below this average magnitude of voltage, the discharge inductance 28 attempts to maintain its former current flow at a substantially constant value. Hence during this time, its upper terminal becomes negative and its lower terminal becomes positive with the result that a substantially constant current may flow from the second capacitor 22 through the second rectifier 24 and discharge resistor 30 into the discharge inductance 28. Another result of the substantially constant current flow through the discharge inductance 28 is to permit the voltage between the terminals 14, 16 to fall to zero, i.e., to follow the rectified source voltage. For a sinusoidal source this means that the rectified waves 36 are substantially true half sine waves which fall to zero.

In FIGURE 2, it will be seen that the waves 42 of the output signal have the same phase relation as and are synchronized with the rectified waves 36 which appear across the terminals 14, 16. If it is desired to change the duration of the waves 42 of the output signal, a direct current bias voltage may be serially inserted between the bias terminals 32, 34 with the positive terminal of the bias voltage coupled to the left-hand bias terminal 32 and with the ngeative terminal of the bias voltage coupled to the right-hand terminal 34. This bias voltage changes the rectified waves 42 shown in FIGURE 2 to one set of alternate waves of one magnitude and time duration, and to a second set of waves alternate with the first set, the second set being of a second magnitude and time duration. Thus, one set of waves has an increased magnitude and a time duration greater than 180°, and the other set of waves has a decreased magnitude and a time duration correspondingly less than 180°. The changed rectified waves may be used to change the waves 42 of the output signal in a corresponding manner.

Figure 3:
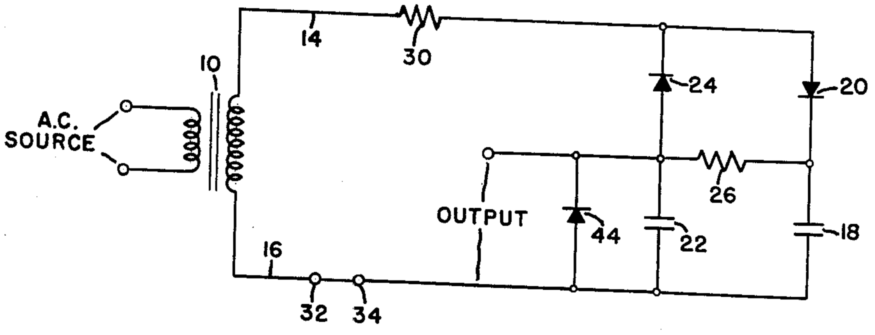
FIGURE 3 shows an embodiment of the invention for producing a sawtooth wave in response to every other half cycle of an alternating current source.

FIGURE 3 shows another embodiment of the invention that produces sawtooth waves only during alternate half cycles of the alternating current source. One difference between FIGURE 3 and FIGURE 1 lies in the fact that the circuit of FIGURE 3 operates from half waves of rectified alternating current. Another difference lies in the use of a limiting rectifier 44 coupled in parallel with the second capacitor 22 and poled to permit, during appropriate half cycles, current to flow directly from the second terminal 16 to the first terminal 14 without charging either of the capacitors 18, 22. Instead of the rectifier network 12 of FIGURE 1, the secondary winding of the transformer 10 is coupled directly to the terminals 14, 16. The first terminal 14 is coupled through the discharge resistor 30 to the first rectifier 20 and first capacitor 18, and to the second rectifier 24 and second capacitor 22. The charging resistor 26 is also provided in the embodiment of FIGURE 3. In operation, the first capacitor 18 receives a charging current during alternate half cycles, since the first rectifier 20 only permits current flow during such alternate half cycles. The second capacitor 22 is charged from the first capacitor 18, and provides a sawtooth as described in connection with FIGURE 1. The sawtooth provided by the second capacitor 22 is prevented from going below a reference level during the time the terminal 14 is negative with respect to the terminal 16 by the limiting rectifier 44. In contrast to the discharge arrangement of FIGURE 1, the second capacitor 22 discharges towards the first terminal 14 when it is negative with respect to the second terminal 16. Hence, the discharge circuit across the terminals 14, 16 is inherently provided by the direct current path including the secondary winding of the transformer 10 and by the discharge resistor 30. A bias potential may be serially inserted between the bias terminals 34, 36 to provide sawtooth waves during the alternate half cycles that have a greater time duration (i.e., greater than 180° with respect to the alternating current source cycle).

Figure 4:
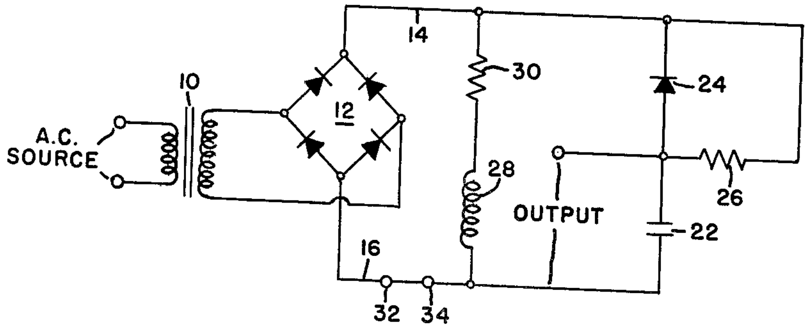
FIGURE 4 shows an embodiment of the invention for producing cosine shaped waves in response to each half cycle of an alternating current source.
Figure 5:
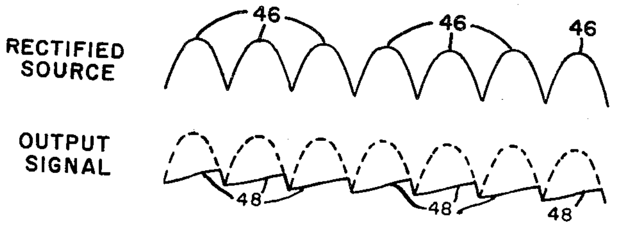
FIGURE 5 shows waveforms for explaining the operation of the embodiment of FIGURE 4.

FIGURE 4 shows another embodiment of the invention for producing output waves having a cosine shape. In FIGURE 4, it will be seen that the first capacitor 18 and first rectifier 20 have been omitted. The second capacitor 22 is charged directly through the charging resistor 26 by the rectified waves 46, shown in FIGURE 5, which are present on the terminals 14, 16. Thus, the second capacitor 22 charges in a manner which may be described as the cosine relation of the half sine waves 46 applied until the voltage on the first terminal 14 falls below a predetermined level. At this time, the second capacitor 22 discharges through a path including the second rectifier 24, the discharge resistor 30, and the discharge inductance 28 to produce the waves 48 shown in FIGURE 5.

Figure 6:
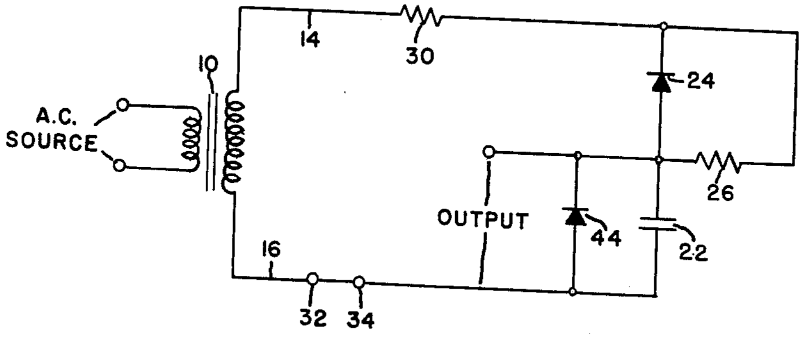
FIGURE 6 shows an embodiment of the invention for producing cosine shaped waves in response to every other half cycle of an alternating current source.

FIGURE 6 shows another embodiment of the invention that produces output signals having a cosine shape only during alternate half cycles of the alternating current source. One difference between FIGURE 6 and FIGURE 4 lies in the fact that the circuit of FIGURE 6 operates from half waves of rectified alternating current. Another difference lies in the use of the limiting rectifier 44 coupled in parallel with the second capacitor and poled to permit, during appropriate half cycles, current to flow directly from the second terminal 16 to the first terminal 14 without charging the capacitor 22. Instead of the rectifier network 12 of FIGURE 4, the secondary winding of the transformer 10 is coupled directly to the terminals 14, 16. The first terminal 14 is coupled through the discharge resistor 30 to the second rectifier 24 and second capacitor 22. The charging resistor 26 is coupled across, or in parallel with, the second rectifier 24. In operation, the second capacitor 22 is charged directly through the resistors 26, 30 by the rectified waves when the first terminal 14 is positive with respect to the second terminal 16. During the other alternate half cycles, the second capacitor 22 discharges through a direct current path including the second rectifier 24, the discharge resistor 30, and the inductance present in the secondary winding of the transformer 10. Hence the discharge resistor 30 typically smaller in magnitude than the charging resistor 26. A bias potential may be serially inserted between the bias terminals 32, 34.

The invention described in the various embodiments shown in the figures provides a novel wave generating circuit for producing waves having sawtooth shape or cosine shape. These waves can be used in timing circuits, or in firing circuits. Although the invention has been described with reference to these particular embodiments, it is to be understood that modifications may be made by persons skilled in the art without departing from the spirit of the invention or from the scope of the claims.

What I claim as new and desire to secure by Letters Patent of the United States is:

1. A wave generating circuit comprising a source of rectified alternating current potential, a first rectifier, a first capacitor, means coupling said first rectifier and said first capacitor in a first series circuit across said source, said first rectifier being poled to permit current to flow through said first series circuit in one direction in response to potentials of said source above a predetermined level, a second rectifier, a second capacitor, means coupling said second rectifier and said second capacitor in a second series circuit across said source, said second rectifier being poled to permit current to flow through said second series circuit in the opposite direction in response to potentials of said source below said predetermined level, a charging path including an impedance coupled between the junction of said first rectifier and capacitor and between the junction of said second rectifier and capacitor, a discharging circuit including a resistance and an inductance coupled in a series circuit across said source, and means coupled to said second capacitor for deriving an output signal therefrom.

2. A wave generating circuit comprising a source of alternating current potential having an internal impedance capable of carrying direct current, a first rectifier, a first capacitor, means coupling said first rectifier and said first capacitor in a first series circuit between first and second terminals, a discharging path comprising a resistance coupled between said source of potential and said first and second terminals, said first rectifier being poled to permit current to flow through said first series circuit in one direction in response to potentials of said source above a predetermined level, a second rectifier, a second capacitor, means coupling said second rectifier and said second capacitor in a second series circuit between said first and second terminals, a third rectifier coupled in parallel with said second capacitor, said second rectifier being poled to permit current to flow through said second series circuit in the opposite direction in response to potentials of said source below said predetermined level and said third rectifier also being poled to permit current to flow in said opposite direction, a charging path including an impedance coupled between the junction of said first rectifier and capacitor and between the junction of said second rectifier and capacitor, and means coupled to said second capacitor for deriving an output signal therefrom.

References Cited by the Examiner

UNITED STATES PATENTS

| | | | |
|---|---|---|---|
| 2,731,571 | 1/56 | Chance | 307—107 X |
| 2,732,528 | 1/56 | Anderson | 307—107 X |
| 3,078,408 | 2/63 | Colterjohn | 307—108 |

FOREIGN PATENTS

| | | |
|---|---|---|
| 587,965 | 11/33 | Germany. |
| 706,715 | 4/54 | Great Britain. |
| 721,139 | 12/54 | Great Britain. |

MILTON O. HIRSHFIELD, *Primary Examiner.*

ORIS L. RADER, LLOYD McCOLLUM, *Examiners.*